United States Patent
Strasser et al.

(10) Patent No.: US 6,167,859 B1
(45) Date of Patent: *Jan. 2, 2001

(54) FIBER REINFORCED CERAMIC MATRIX COMPOSITE INTERNAL COMBUSTION ENGINE INTAKE/EXHAUST VALVES

(75) Inventors: Thomas Edward Strasser, Corona; Steven Donald Atmur, Riverside, both of CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/994,592

(22) Filed: Dec. 19, 1997

Related U.S. Application Data

(63) Continuation-in-part of application No. 08/704,348, filed on Aug. 28, 1996, now Pat. No. 5,738,818.

(51) Int. Cl.[7] ............................................. F01L 3/02
(52) U.S. Cl. ................................................ 123/188.3
(58) Field of Search ....................... 123/188.3; 29/888.45

(56) References Cited

U.S. PATENT DOCUMENTS

| | | | |
|---|---|---|---|
| 4,359,022 | * 11/1982 | Nakamura et al. | 123/188.3 |
| 4,928,645 | 5/1990 | Berneburg et al. | 123/188.3 |
| 5,094,200 | 3/1992 | Fontichiaro | 123/188.3 |
| 5,503,122 | * 4/1996 | Ritland et al. | 123/188.3 |
| 5,738,818 | * 4/1998 | Atmur et al. | 264/624 |
| 5,792,402 | * 8/1998 | Rivers et al. | 264/103 |

* cited by examiner

Primary Examiner—Andrew M. Dolinar
Assistant Examiner—Hai Huynh
(74) Attorney, Agent, or Firm—Terry J. Anderson; Karl J. Hoch, Jr.

(57) ABSTRACT

A fracture-resistant, thermally stable intake or exhaust valve for an internal combustion (IC) engine. The valve has a stem portion and a head portion, both of which are formed of fiber reinforced ceramic matrix composite (FRCMC) material. This FRCMC material generally includes a polymer-derived ceramic resin in its ceramic state, fibers, and filler materials. Employing FRCMC material to form the valve is advantageous as FRCMC material is highly temperature resistant and temperature stable, thereby allowing for increased engine operating temperatures. FRCMC material is also ductile, thus making the valve fracture resistant. The FRCMC material is also flaw-insensitive in that any flaw within the structure of the valve will not result in cracking and failure. In addition, FRCMC valves are considerably lighter than the existing metal valves. This provides an opportunity to reduce the weight of the overall valve train, thereby increasing engine performance. The addition of certain filler materials allows the FRCMC material to be tailored to exhibit a desired degree of harness and/or a desired coefficient of friction. Increasing the hardness of the head of the valve allows it to better withstand the violent environment of the engine cylinder, and lowering the coefficient of friction facilitates the valve movement within the engine.

19 Claims, 3 Drawing Sheets

FIBER REINFORCED CERAMIC MATRIX COMPOSITE INTERNAL COMBUSTION ENGINE INTAKE/EXHAUST VALVES

CROSS REFERENCE TO RELATED APPLICATION

This application is a continuation-in-part of U.S. patent application Ser. No. 08/704,348, filed Aug. 28, 1996, now U.S. Pat. No. 5,738,818.

BACKGROUND

1. Technical Field

This invention relates to intake and exhaust valves for an internal combustion (IC) engine, and more particularly, to such valves formed of a fiber reinforced ceramic matrix composite (FRCMC) material and methods for making them.

2. Background Art

In a typical four-stroke gasoline-powered internal combustion (IC) engine, an intake valve is designed to open during the intake stroke of the engine to allow a fuel mixture to enter the engine cylinder. Once the intake stroke is complete, the intake valve closes to seal the engine cylinders so that the fuel mixture can be compressed during a compression stroke of the engine. Upon completion of the compression stroke, the fuel mixture is ignited causing an expansion of gases which push the piston down in the cylinder. At this point an exhaust valves opens to allow exhaust gases to be expelled from the cylinder as the piston moves up in the cylinder (i.e. the exhaust stroke). Other types of IC engines work similarly, some having only one valve per engine which acts as both the intake and exhaust valve, while others have multiple intake and exhaust valves per cylinder. The basic structure of a valve, as shown in FIG. 1, includes a stem 12 and a head 14. The head 14 has a bottom surface 16 which is directed toward the interior of the cylinder of an IC engine when the valve is installed therein. In addition, the head 14 of the valve has tapered side surface 18 which interfaces with the valve seats of the engine in order to form the aforementioned seal when the valve is closed.

The valves in any type of IC engine operate in a violent environment characterized by extreme operating temperatures and temperature variations, excessive gas pressures, corrosive fuel components, and intense hammering caused by the opening and closing of the valves. As such valves need to be very tough and durable. Most valves are made of metal, often involving complex multi-part constructions and exotic alloys. For example the head of the valve could be made of a high temperature resistant alloy to withstand the temperatures found inside the cylinder, whereas the stem could be made of a alloy which is stiffer and provides good bearing qualities. These characteristics are desirable as the stem resides within a valve guide which assists in aligning the valve and sealing the lower portion of the valve and engine cylinder from oil in the upper part of the engine. Thus, the stem must withstand the reciprocal motion between it and the valve guide. Valves also often have coatings or hollow portions filled with heat dissipating salts for the same reasons.

Although metal valves can be made more durable by the use of various alloys, coatings, etc., they still have limits as to the temperatures which they can withstand. However, the performance and fuel economy of an IC engine can be improved by increasing the temperature of the combustion chamber (i.e. the cylinder) beyond the limits of metal valves. This improvement in performance and fuel economy results because the higher chamber temperatures cause a more complete burning of the fuel. Therefore, more energy is released and less fuel is required to drive the engine. However, because of the temperature limitations of metal valves, operating at these higher temperatures has not been possible because, among other things, the valves would fail (which is often termed "burning the valves"). Typically, the valves fail because the increased temperatures cause the valves to expand to a degree that they no longer form a seal with the associated valve seat. This mismatch occurs because the head of an IC engine, which includes the valve seats, is cooled, typically by water or cooling fluid circulating through channels in the head. As the head is cooled, the valve seats do not tend to expand significantly while the engine is operating. However, the intake and exhaust valves of the engine are not cooled like the valve seats. As a result, the valves expand as the engine heats up. The tapered surface of the head of a valve which interfaces with the valves seats is often specially ground by an expensive and complex process referred to as a triple grind. The special grinding ensures the valve head will seal with the valve seat even though it expands as the engine heats up. However, if the temperatures become too great, even special grinding cannot accommodate the expansion of the valve head. If the valve head expands to the point that it not longer seats into the valve seat, the valve and the valve seat can become physically damaged by the mismatch, and hot exhaust gases can leak through any gaps formed between the two structures causing localized burning of the metal forming the valves and valve seats. The resulting damage can increase pollutants emitted by the engine, reduce engine performance, or even cause the engine to fail completely.

One attempt to resolve the problems associated with conventional metal valves has been to make them from a monolithic ceramic material. For example, valves formed of silicon nitride are commercially available. Monolithic ceramic valves have the advantage of being extremely resistant to damage by heat in that ceramic material has a low thermal conductivity and will not readily absorb heat. In addition, ceramic materials are thermally stable in that they exhibit a low coefficient of thermal expansion and so do not expand significantly as the temperature increases. Thus, even at higher engine operating temperatures, ceramic valves will not expand to an extent which would jeopardize their sealing with the valve seats. As a result there is no damage or burning of these structures. Additionally, monolithic ceramic valves made of materials such as silicon nitride tend to be hard, while at the same time having external surfaces which exhibit a low coefficient of friction (i.e. slipperiness). The hardness of the ceramic material is advantageous as it makes the bottom face of the head portion of the valve resistant to the violent environment of the cylinder of the engine. The low coefficient of friction or slipperiness of the material is advantageous for two reasons. First, the slipperiness of the surface facilitates the sliding of the tapered surface of the valve head in and out of the valve seat without causing any abrasive grinding between the interfacing surfaces or a valve sticking condition. In addition, the stem of the valve which resides within the aforementioned valve guide would advantageously have a slippery surface. For example, the slipperiness of a valve made from a silicon nitride ceramic material results in the valve stem sliding easily within the valve guide. As such the stem and the valve guide will not be damaged which could otherwise cause a misalignment of the valve and/or oil to drip down the valve stem from the upper part of the engine.

Ceramic valves also have another advantage in that they weigh less than metal valves. The weight and size of the entire valve train is effected by the weight of the valves. Lighter valves allow the use of a smaller, lighter valve springs, which in turn means the camshaft does not have to be as stiff. Thus, a smaller, lighter camshaft can be employed. In addition, the rocker arms and push rods (if employed) can be smaller and lighter as they do not have as much weight to push around. Thus, the entire valve train can be made lighter by employing lighter valves. Reducing the weight of the valve train makes for a lighter, more efficient engine.

However, monolithic ceramic valves present unique problems of their own. Monolithic ceramic structures tend to be porous and brittle, and extremely difficult to form without structural flaws. These structural flaws make the material subject to cracking. Thus, the monolithic ceramic valve is susceptible to catastrophic failure when impacted, or otherwise subjected to even moderate forces. They are also strain intolerant and cannot be deflected more than 0.1 percent without being fractured. These are very undesirable characteristics for a moving part such as a intake/exhaust valve. Further, if the ceramic valve fails broken pieces of the valve can cause further damage to a working engine.

Monolithic structures are also difficult to manufacture. For example, production yields for ceramic valves is often 50 percent or less. This, of course, increases the cost of monolithic ceramic valves.

Accordingly, there is a need for IC engine valves which exhibit the high temperature resistance, light weight, minimal thermal expansion, hardness and slipperiness of a monolithic ceramic valve (such as one made of silicon nitride), but which are fracture resistant and easy to manufacture with high yield rates.

Wherefore, it is an object of the present invention to provide a valve for an IC engine which is flaw insensitive, strong and ductile, so as to be fracture resistant and capable of withstanding the strains encountered in an operating engine without failing.

Wherefore, it is another object of the present invention to provide a valve for an IC engine which exhibits a low thermal conductivity so as to be capable of withstanding high temperatures, a low coefficient of thermal expansion, and is light weight in comparison to metal valves.

Wherefore, it is yet another object of the invention to provide a valve for an IC engine which exhibits a high degree of hardness and a surface having a low coefficient of friction.

Wherefore, it is still another object of the invention to provide a valve for an IC engine which is easy to manufacture and capable of approaching a yield rate of 100 percent.

SUMMARY

The above-described objectives are realized with embodiments of the present invention directed to a fracture-resistant, thermally stable intake or exhaust valve for an internal combustion (IC) engine. The valve has a stem portion and a head portion, both of which are formed of fiber reinforced ceramic matrix composite (FRCMC) material. This FRCMC material generally includes a polymer-derived ceramic resin in its ceramic state, fibers, and filler materials.

The pre-ceramic resin used to form the FRCMC material can be any commercially available polymer-derived ceramic precursor resin, such as silicon-carboxyl resin or alumina silicate resin, and the fibers are preferably at least one of alumina, Nextel 312, Nextel 440, Nextel 510, Nextel 550, silicon nitride, silicon carbide, HPZ, graphite, carbon, and peat. The fibers are also preferably coated with an interface material which increases the ductility exhibited by the FRCMC material. Specifically, the interface material preferably includes at least one 0.1–0.5 micron thick layer of at least one of carbon, silicon nitride, silicon carbide, silicon carboxide, or boron nitride.

The fibers forming the stem portion of the valve preferably take the form of a continuous, woven fiber rope. The fiber rope is continuous because each fiber therein runs the entire length of the rope. In addition, the percent by volume of the stem portion constituting the fiber rope is preferably as large as possible. The large percentage of fiber making up the stem, in combination with the continuous, woven structure of the fiber rope, gives the stem portion a high degree of ductility and stiffness so as to survive the hammering causes by the opening and closing of the valve when the engine is running, and to maintain the alignment of the valve head. In addition, it is preferred that the stem portion have an outer layer which includes filler material which lowers the coefficient of friction exhibited by the surface. This makes the stem portion slippery and facilitates its movement through a valve guide. Preferably, the filler material is at least one of carbon or silicon nitride. The degree to which the coefficient of friction is lowered is dependent upon the percentage by volume of filler material making up the outer layer of the stem, and as such it is preferred that this percentage be large enough to produce the desired slipperiness.

The head of the valve must withstand the violent environment associated with the inside of the cylinder of the engine, as well as smoothly interfacing with a valve seat to seal the cylinder. This interfacing must be accomplished without damage to the valve seat or sticking of the valve within the seat. In view of these requirements, it is preferred that the head portion include filler material which increases its hardness and decreases its coefficient of friction. Preferably, the filler material is at least one of silicon nitride, boron carbide, boron nitride, or silicon carbide. This filler material would preferably constitute a sufficient percentage of the valve head to ensure the head is hard enough to survive the cylinder environment, as well as ensuring the head's surface is slippery enough to ensure a smooth interface with the valve seat.

It is noted that in the preferred embodiment of the valve, the woven fiber rope associated with the stem portion has a end which is frayed (i.e. un-braided) and which extends into the upper region of the head portion. This strengthens the connection between the stem and head portions of the valve, above that which can be provided by the ceramic matrix of the FRCMC material alone.

Forming the IC engine valve from the aforementioned FRCMC material has significant advantages. For example, FRCMC material is highly temperature resistant so that the operating temperatures of the IC engine can be increased without destroying the valve. In addition, FRCMC material is temperature stable in that it does not expand significantly with increasing temperature. Thus, the head of the valve will not expand to a degree that causes damage to it or the valve seat. FRCMC material is also ductile, thus making the valve fracture resistant and capable of withstanding the hammering caused by the opening and closing of the valve, as well as the thermally-induced strains caused by wide temperature variations associated with an IC engine. The FRCMC material is also flaw-insensitive in that any flaw within the structure of the valve will not result in cracking and failure.

In addition, FRCMC valves are considerably lighter than the existing metal valves. This provides an opportunity to reduce the weight of the overall valve train, thereby increasing engine performance. As mentioned above, the addition of certain filler materials allows the FRCMC material to be tailored to exhibit a desired degree of harness and/or a desired coefficient of friction. This tailoring can also be localized such that the degree of hardness and the coefficient of friction can vary from one part of the valve to another. Finally, it is noted that FRCMC material, being a mixture of pre-ceramic resin, fibers and filler materials in its raw state, is readily formable via a variety of methods. This makes the engine valve according to the present invention easy to manufacture. The ease in manufacturing especially applies to the preferred method of compression molding the IC engine valves.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 3A–C are views of a compression mold capable of molding the intake or exhaust valve according to the present invention, wherein FIG. 3A shows a cross-sectional side view of both the female and male dies of the mold, FIG. 3B shows a top view of the female die of the mold, and FIG. 3C shows a cross-sectional end view of the male and female dies of the mold.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
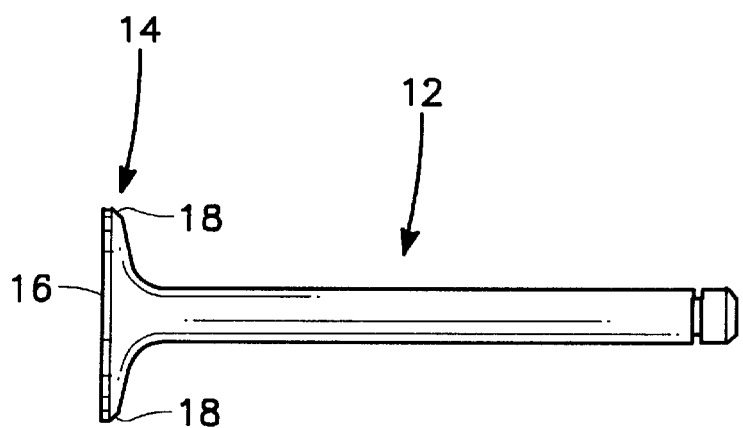
FIG. 1 is a simplified diagram of a intake or exhaust valve of an internal combustion engine.

As described previously and shown in FIG. 1, a valve for an internal combustion (IC) engine generally includes a stem 12 which transitions at one end into an integral head 14. The head 14 has a bottom surface 16 which is directed toward the interior of the cylinder of an IC engine and tapered side surface 18 which interfaces with the valve seats of the engine. This same external structure is employed in an intake/exhaust valve according to the present invention, except, the entire valve is formed of fiber-reinforced ceramic matrix composite (FRCMC) material.

FRCMC materials in general are made by combining any commercially available polymer-derived ceramic precursor resin, such as silicon-carboxyl resin or alumina silicate resin, with some type of fibers. Examples of appropriate ceramic precursor resins include BLACKGLAS™ sold by Allied Signal, CERASET™ sold by the Lanxide Corporation, SYLRAMIC™ sold by Dow Chemical, STARFIRE™ sold by the Starfire Corporation, and TOREN™ sold by the Toren Corporation. An example of an appropriate alumina silicate pre-ceramic resin is CO2 sold by Applied Polymerics. Examples of types of fibers which might be employed in an FRCMC material include alumina, Nextel 312, Nextel 440, Nextel 510, Nextel 550, silicon nitride, silicon carbide, HPZ, graphite, carbon, and peat. To add toughness to the material, the fibers being incorporated into the FRCMC material are preferably first coated with an interface material such as carbon, silicon nitride, silicon carbide, silicon carboxide, boron nitride, or multiple layers of one or more of these interfacial materials. The interface material prevents the resin from adhering directly to the fibers of the fiber system. Thus, after the resin has been converted to a ceramic, there is a weak interface between the ceramic matrix and the fibers. This weak bond enhances the ductility exhibited by the FRCMC material. In addition, the FRCMC material can include filler materials preferably in the form of powders having particle sizes somewhere between about 1 and 50 microns. The resin, fiber, and possibly filler material mixture is generally formed into the shape of the desired structure via one of a variety of methods and heated for a time to a temperature, as specified by the material suppliers (typically between 1,500° F. and 2,000° F.), which causes the resin to be converted into a ceramic.

The ceramic matrix of the FRCMC material imparts a high temperature resistance and low coefficient of thermal expansion to the valve. The fibers and any filler materials included in the FRCMC material can also contribute to these characteristics depending on the types chosen. For example, the use of ceramic fibers and a ceramic filler material would enhance the thermal resistance and stability of the material. Thus, a valve made from FRCMC material can mimic the desirable thermal qualities of a monolithic ceramic valve. FRCMC materials are also lightweight in comparison to metal valves, and so provide the same advantages as monolithic ceramic valves. Namely, the entire valve train can be made lighter and so the improve the performance of the engine. However, the ceramic matrix being formed from the aforementioned pre-ceramic resins, is relatively soft and does not produce a surface which is particularly slippery. These desired qualities can be achieved by the addition of filler materials to the FRCMC material. Thus, a valve made from FRCMC materials can also be made to mimic the hardness and low coefficient of friction associated with a monolithic ceramic valve made from a ceramic material such as silicon nitride.

Valves made of FRCMC materials can not only exhibit the advantageous high temperature resistance, light weight, low coefficient of thermal expansion, hardness, and surface slipperiness associated with monolithic ceramic valves, but can also exhibit a fracture-resistance not possible with the monolithic ceramic valves. The fibers and interface materials incorporated into the FRCMC material provide ductility to the FRCMC structure. Ductility is the measure of how much strain the structure can withstand before fracturing or tearing. This ductility can give the FRCMC structure the strength to withstand the stresses and strains typically encountered by an engine valve. In addition, any flaws in the ceramic matrix of a FRCMC valve will not cause cracking because the integrated fibers will prevent it. Accordingly, FRCMC valves can be made ductile enough to prevent the catastrophic failures associated with the fracture-prone and flaw-sensitive monolithic ceramic valves.

The degree of ductility, as well as the degree of hardness and surface slipperiness, necessary to prevent a failure of a FRCMC valve or surrounding engine components will vary depending on the type of engine involved and the particular application in which it is to be employed. Thus, it can be desirable to tailor these attributes exhibited by the FRCMC material to the application. The tailoring process is a subject of a co-pending application entitled POLYMER-DERIVED FIBER REINFORCED CERAMIC MATRIX COMPOSITE MATERIALS HAVING TAILORED DUCTILITY, HARDNESS AND COEFFICIENT OF FRICTION CHARACTERISTICS, having the same inventors as the present application and assigned to a common assignee. This co-pending application was filed on Oct. 14, 1998 and assigned Ser. No. 09/172,361. The disclosure of the co-pending application is hereby incorporated by reference. Generally, the above-described tailoring involves incorporating the appropriate type of fibers into the composite in sufficient quantities to produce the desired degree of ductility necessary to ensure the survival of the a valve made from FRCMC material. Additionally, the hardness and the coefficient of friction exhibited can be tailored by incorporating the appropriate types of filler material into the composite in sufficient quantities to produce the desired degree of these characteristics. In both cases, the degree to which these respective characteristics are exhibited varies with the type and percent by volume of fibers and filler materials incorporated into the structure. Finally, it is noted that the choice of interface material and the form of the fibers can have an effect on the degree of ductility exhibited by the FRCMC material. For example, interface materials such as boron nitride will provide a greater degree of ductility than will glassy carbon. Similarly, fibers taking the form of a continuous configuration, such as with a woven fiber system, will produce a higher degree of ductility than will a non-continuous fiber configuration (e.g. chopped fibers).

It must be noted that there is a trade off between the degree of ductility and the degree of hardness and slipperiness that can be imparted to the FRCMC material. Essentially, the addition of the filler materials to increase the hardness and/or lower the coefficient of friction also tends to lower the ductility of the material as the filler materials displace some of the fibers in the composite. This tradeoff has a unique impact on the use of FRCMC material for IC engine valves. Namely, the amount of filler material that would have to be added uniformly throughout the composite in order to achieve the desired coefficient of friction at the surface of the stem of the valve may, in some applications, make the stem less ductile than desire to ensure its fracture resistance. This is especially true in view of the desire that the stem exhibit a high degree of ductility and be very stiff in the longitudinal direction. This ductility and stiffness can be achieved using FRCMC material by employing a fiber rope in the stem of the valve. Essentially, this fiber rope consists of a plurality of continuous fibers all approximately the length of the stem which have been woven together in a manner which makes the rope resistant to bending. Preferably, this fiber rope would be very tightly packed and have a diameter, once compressed, approximately matching that of the finished valve stem, so as to maximize the amount of fibers in the stem portion of the valve. This maximization of the percentage of fibers, as well as the continuous, woven configuration of the fiber rope, ensures a high degree of ductility and stiffness. Given the maximizing of the amount of fiber in the stem portion of the valve, there is little room left for incorporating filler materials to achieve the desired hardness and coefficient of friction. However, as it is only the surface of the stem that need exhibit a low coefficient of friction, it is possible to incorporate the necessary amount of filler material only in a thin layer adjacent the surface. In this way, the stem can exhibit the desired slipperiness at its surface while still being very ductile and stiff. Examples of appropriate filler materials that can be incorporated to produce the desired surface slipperiness are carbon or silicon nitride. Preferably, the stem of the valve would incorporate between about 5.0 and 25.0 percent by volume of filler materials in an outer layer, and between about 35.0 and 50.0 percent by volume of fibers within the interior portion of the stem. These percentages of filler materials and fibers would produce a stem exhibiting the desired ductility, stiffness, and surface coefficient of friction.

In contrast, it is desirable that the face of the valve head be extremely hard so as to withstand the violent environment associated with the interior of the cylinder, as well as a low coefficient of friction at its surface to ensure a smooth interface with the valve seat with no sticking. This can be accomplished by incorporating a sufficient amount of at least one of silicon nitride, boron nitride, boron carbide, or silicon carbide to produce the desired characteristics. Obviously, to incorporate this larger percentage of filler material in the head of the valve, the amount of fiber cannot be as high as in the stem. Preferably, the head of the valve would incorporate between about 5.0 and 25.0 percent by volume of filler materials, and between about 30.0 and 40.0 percent by volume of fibers. These fibers are preferably in the form of "chopped" fibers each having a length of about 0.25 inches, although lengths ranging up about 1.0 inch can be acceptable. These percentages of filler materials and fibers would produce a valve head exhibiting an advantageous ductility, hardness, and surface coefficient of friction.

To ensure a smooth transition between the stem and head of the valve, it is also-preferred that the fiber rope forming part of the stem extend into the upper region of the head of the valve and that the end of the fiber rope that extends into the head be frayed (i.e. unbraided) so as to resemble the bristles of a brush. In this way the fibers from the stem will form part of the total fiber content of head portion of the valve and provide a stronger structural connection between the stem and the head, than afforded by the integrated ceramic matrix alone.

Figure 2:
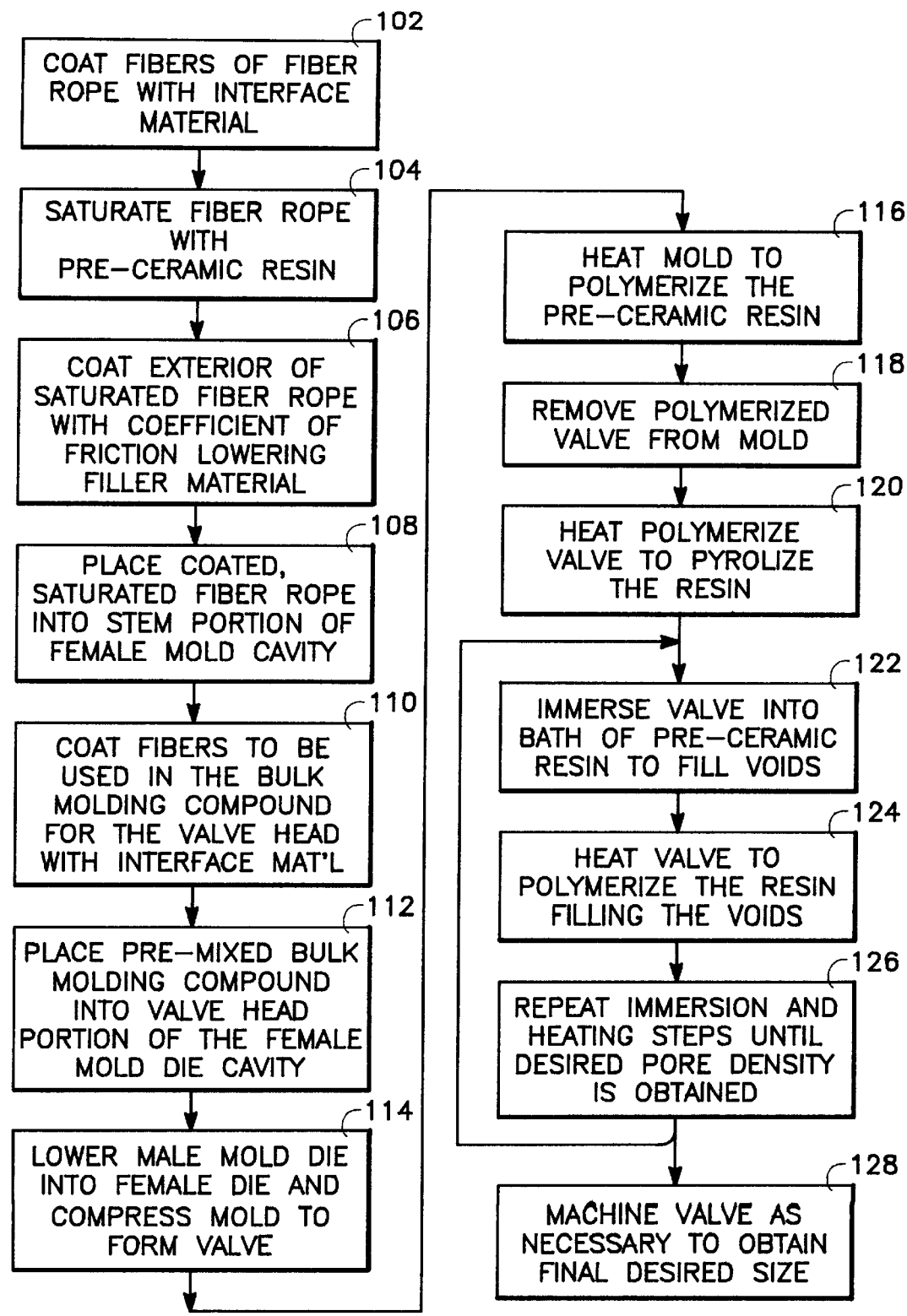
FIG. 2 is a block diagram of a method for forming an intake or exhaust valve in accordance with the present invention.

The preferred method of forming an FRCMC engine valve according to the present invention is via a compression molding process as described in a co-pending application entitled COMPRESSION/INJECTION MOLDING OF POLYMER-DERIVED FIBER REINFORCED CERAMIC MATRIX COMPOSITE MATERIALS having the same inventors as the present application and assigned to a common assignee. This co-pending application was filed on Aug. 28, 1996 and assigned Ser. No. 08/704,348. The disclosure of this co-pending application is herein incorporated by reference. The following simplified process, summarized in FIG. 2, provides an example of using the aforementioned compression molding process to form a FRCMC valve:

(a) First, the fibers of the woven fiber rope as described previously are coated via well known methods with the aforementioned interface material (step 102). In this case, one 0.1 to 0.5 micron thick layer of boron nitride was chosen as the interface material. Once coated, the fiber rope is saturated with pre-ceramic resin, which in the case of this example is BLACKGLAS resin (step 104). The rope is saturated with resin for two reasons. First, as the fibers are tightly packed in the fiber rope, saturating them prior to molding ensures the resin is uniform throughout. If the fiber rope where place in the mold dry, there is a risk that resin pushed through the fibers during molding would not reach all areas. These dry area could undesirably weaken the structure.

(b) A second reason the fiber rope is saturated with resin is to facilitate coating the outside of the rope with filler materials. Once the fiber rope is saturated with resin, it is coated with a filler material(s) which will impart the desired coefficient of friction to the surface of the stem (step 106). This coating can be accomplish via any appropriate conventional method, such as rolling the saturated fiber rope in the filler material or tumbling the rope with the filler material. The previously-described frayed end of the fiber rope can be coated with the filler material, or masked to prevent this coating as desired. If it is coated, the amount of filler material involved must be taken into consideration when forming the head of the valve.

(c) The coated resin-saturated fiber rope is then placed into the portion of a female mold die in which the stem of the valve will be formed (step 108). The frayed end of the fiber rope is made to extend into the upper part of the portion of the female mold die where the head of the valve will be formed. The interior female mold die has a shape which in combination with a male mold die forms a cavity therebetween having the desired shape of the engine valve.

(d) A quantity of pre-mixed bulk molding compound is also placed in the valve head portion of the female mold die cavity (step 112). The pre-mixed bulk molding compound is made up of the amount of chopped fiber which once distributed and packed in the valve head portion of the mold will produce, in combination with the fibers of the fiber rope extending into the head portion, the desired percent volume of fiber. In this case, Nextel 312 fibers constituting approximately 50 percent by volume (including the fiber rope fibers) of the valve head and having lengths of about 0.5 inch where chosen. In addition, the molding compound includes the amount of silicon nitride filler material which once distributed and packed in the mold will constitute approximately 25 percent of the valve head (taking into consideration any filler materials coating the frayed portion of the fiber rope associated with the stem of the valve). Finally, the molding compound of this example has the amount of BLACKGLAS resin which at a reasonable viscosity (e.g. about 5,000 to 10,000 centipoises) will facilitate the flow of fibers and filler material, while still allowing it to pass around packed fibers and filler material and out of the resin outlet ports of the compression mold, as described in the aforementioned co-pending application. Additionally, prior to mixing into the bulk molding compound, it is preferred that the fibers be coated with the aforementioned interface material (step 110). In this case, a one 0.1 to 0.5 micron thick layer of boron nitride was chosen as the interface material.

(e) Next, the male mold die is lowered and the mold compressed to form the IC engine valve (step 114). As the fiber rope and bulk molding compound are compressed, the fibers and filler material in the bulk molding compound will pack into place to form the head of the valve with resin filling the spaces between the fibers and filler materials. Excess resin is ejected from the mold through the resin outlet ports. The woven, "un-frayed" portion of the fiber rope being dense will not allow any of the fibers or filler material from the head portion of the mold to infiltrate significantly. However, excess resin present within the fiber rope will be ejected through a resin outlet port. The filler material coating the exterior of the fiber rope will stay in place for the most part and mix with some of the resin during the compression process, thereby forming an external layer which will exhibit the desired coefficient of friction.

(f) The mold is then heated at a temperature and for a time associated with the pre-ceramic resin which polymerizes the resin to form a fiber-reinforced polymer composite structure (step 116).

(g) Next, the polymerized composite structure is removed from the mold (step 118).

(h) And finally, the polymerized composite structure is fired at a temperature and for a time associated with the polymerized resin which pyrolizes it to form a FRCMC structure (step 120).

Once the FRCMC valve is molded via the compression molding process, it is preferred that an additional procedure be performed to eliminate pores created during the required heating cycles. Eliminating these pores strengthens the part. Specifically, after the completion of the heating step which pyrolizes the FRCMC valve, the part is immersed into a bath of a pre-ceramic resin to fill the pores (step 122). The part is then heated at a temperature and for a time associated with the resin filling the pores so as to transform it into a ceramic material (step 124). Unfortunately, the process of heating the resin filling the pores will create further pores. Accordingly, it is desired that the filling and heating steps be repeated until the pore density within the FRCMC valve is less than a prescribed percentage by volume (step 126). This prescribed percentage corresponds to the point where the part will exhibit a repeatable strength from one part to the next. It is believed five iterations of the filling and firing process are required to obtain this repeatable part strength. To facilitate the filling step, it is preferred that the resin has a water-like viscosity. In addition, the FRCMC part could be placed in a vacuum environment to assist in the filling of the pores.

Once the void filing process is complete, any machining necessary to obtain the desired final dimension of the IC valve can be performed via conventional methods (step 128). This final step completes the valve forming process.

Figure 3A:
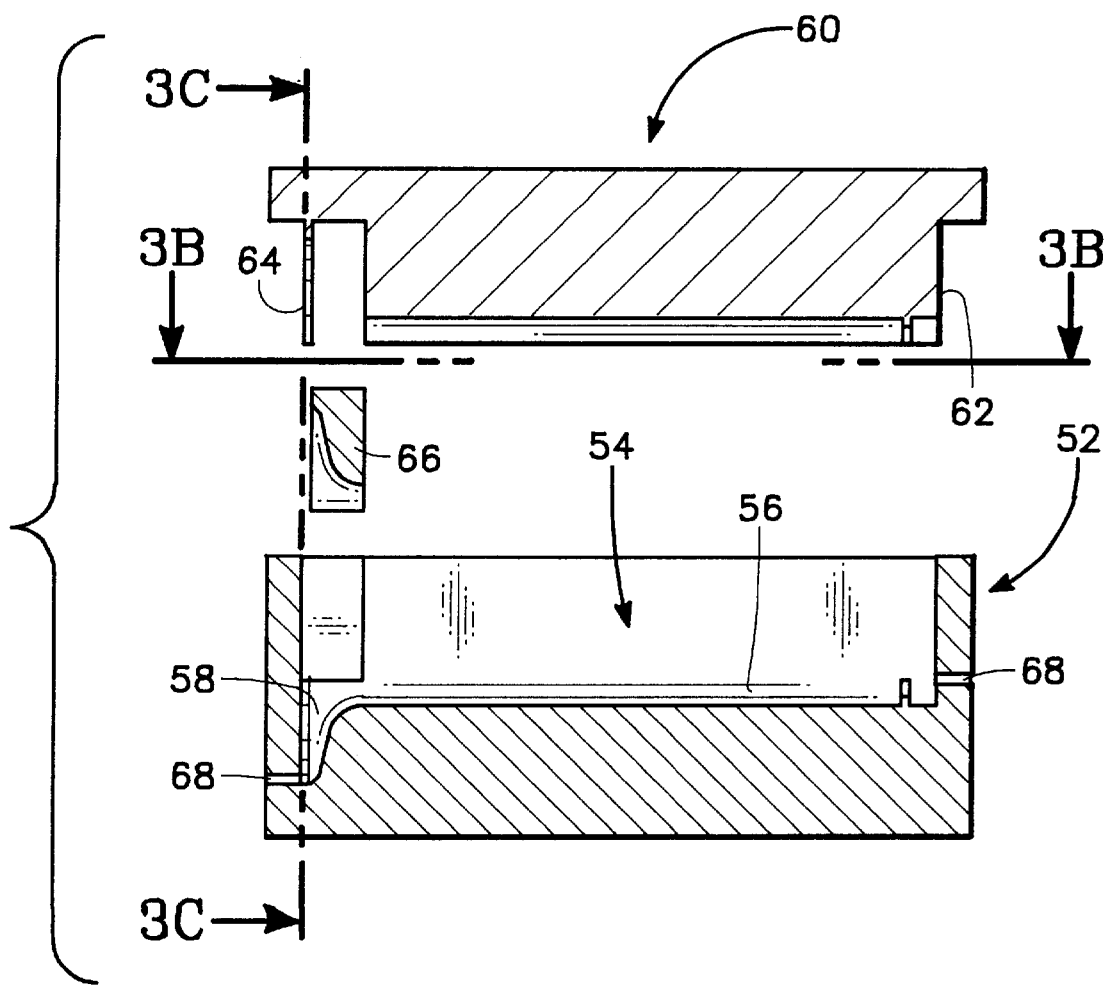
Figure 3B:
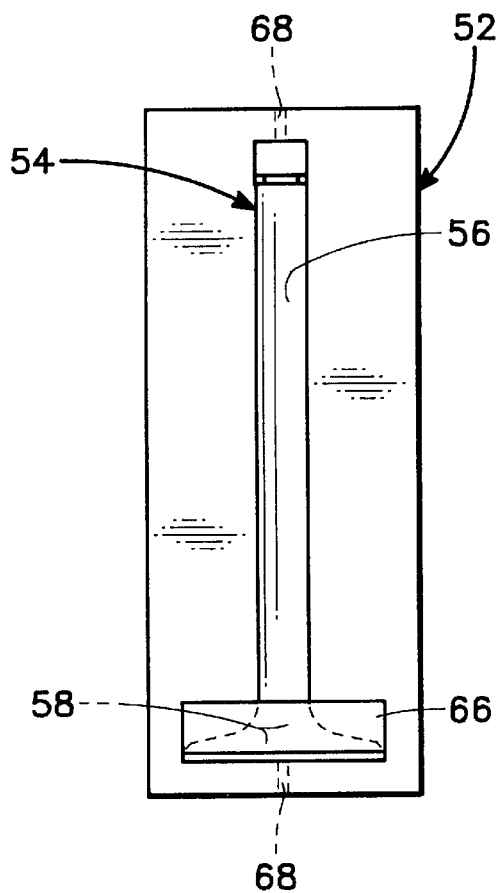
Figure 3C:
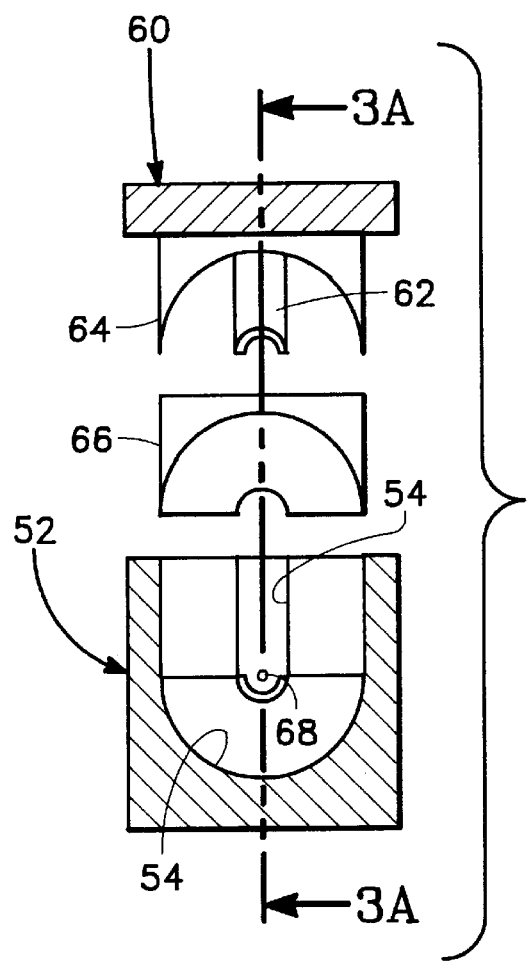

A simplified example of a mold which can be used to form the FRCMC valve by the above-described compression molding process is shown in FIGS. 3A–C, wherein FIG. 3A shows a cross-sectional side view of both the female and male dies 52, 60, FIG. 3B shows a top view of the female die 52, and FIG. 3C shows a cross-sectional end view of the male and female dies 52, 60. The female die 52 of the mold has a cavity 54. The cavity 54 is divided into two sections, a stem section 56, and a head section 58. The male die 60 has two corresponding projections, a stem projection 62 and a head projection 64. The previously-described fiber rope fits into the stem section 56 of the female die cavity, with the frayed end thereof projecting under the cross wall 66 and into the head section 58 of the cavity. The bottom of the stem section 56 of the female die cavity has a concave, semi-circular cross-section. Similarly, the lower part of the stem projection 62 of the male die has a concave, semi-circular cross-section. When the male and female dies are compressed together, the two semi-circular indentations of the stem section 56 and stem projection 62 meet to form a cavity having a circular cross-section with the dimensions of the stem of the valve. Thus, the fiber rope is squeezed into this cavity to form the stem. Likewise, the head section 58 of the cavity of the female die has a concave, semi-circular cross-section and the head projection 64 of the male die has an identical concave, semicircular cross-section. When the male and female dies are compressed together, these semicircular indentations meet to form a cavity having the shape of the head of the valve. The excess resin in the fiber rope residing in the stem-forming portion of the mold, and in the bulk molding compound placed in the head-forming portion of the mold, is forced out of the resin outlet channels 68 during the compression process.

The FRCMC valve can also be fabricated using other methods applicable to FRCMC part formation including resin transfer molding, hot pressing, tape or tow placement, or hand lay-up. It is not intended to limit the invention to any of the described methods. Rather any appropriate method may be employed to form the valve structure from the previously described FRCMC material.

While the invention has been described in detail by reference to the preferred embodiment described above, it is understood that variations and modifications thereof may be made without departing from the true spirit and scope of the invention.

Wherefore, what is claimed is:

1. A fracture-resistant, thermally stable valve for an internal combustion engine, comprising a stem portion and a head portion wherein both the stem and head portions are formed of fiber reinforced ceramic matrix composite (FRCMC) material comprising a polymer-derived ceramic resin in its ceramic state and fibers coated with an interface material for increasing ductility of the composite material, with said composite material of said stem portion comprising a rope structure configuration solely fabricated of woven fiber.

2. The valve of claim 1 wherein the polymer-derived ceramic resin is chosen from silicon-carboxyl resin, or alumina silicate resin.

3. The valve of claim 1 wherein the fibers comprise at least one of alumina, Nextel 312, Nextel 440, Nextel 510, Nextel 550, silicon nitride, silicon carbide, HPZ, graphite, carbon, and peat.

4. The valve of claim 1, wherein the degree of ductility caused by the fibers varies with the percentage by volume of the fibers in the FRCMC material, and wherein a first degree of ductility is desired to be exhibited by the stem portion of the valve, and wherein there is a sufficient quantity of fibers in the stem portion to produce the first degree of ductility.

5. The valve of claim 4, wherein the percentage by volume of the FRCMC material comprising the stem portion of the valve consisting of the fibers is within a range of about 35.0 to 50.0 percent.

6. The valve of claim 5, wherein the fiber rope is woven in such a way as to resists longitudinal bending thereby providing an added stiffness to the stem portion of the valve.

7. The valve of claim 1 wherein the interlace material comprises at least one 0.1–0.5 micron thick layer of at least one of carbon, silicon nitride, silicon carbide, silicon carboxide, or boron nitride.

8. The valve of claim 1, wherein the FRCMC material forming the head portion of the valve further comprises a filler material which increases the hardness and decreases the coefficient of friction exhibited by the head portion.

9. The valve of claim 8, wherein the filler material comprises at least one of silicon nitride, boron nitride, boron carbide, or silicon carbide.

10. The valve of claim 8, wherein the degree of hardness and the coefficient of friction exhibited by the head portion of the valve caused by the filler material varies with the percentage by volume of the filler material in the FRCMC material, and wherein there is a sufficient quantity of filler material in the head portion to produce a desired degree of hardness and a desired coefficient of friction.

11. The valve of claim 10, wherein the percentage by volume of the FRCMC material forming the head portion of the valve consisting of the filler material is within a range of about 5.0 to 25.0 percent.

12. The valve of claim 1, wherein the FRCMC material forming the stem portion of the valve further comprises a filler material which decreases the coefficient of friction exhibited by the surface of the stem portion.

13. The valve of claim 12, wherein the filler material comprises at least one of carbon or silicon nitride.

14. The valve of claim 12, wherein the coefficient of friction exhibited by the surface of the stem portion of the valve caused by the filler material varies with the percentage by volume of the filler material in the FRCMC material, and wherein there is a sufficient quantity of filler material in the stem portion to produce a desired coefficient of friction.

15. The valve of claim 14, wherein the percentage by volume of the FRCMC material forming the stem portion of the valve consisting of the filler material is within a range of about 5.0 to 25.0 percent.

16. The valve of claim 12, wherein the filler material is disposed only in a surface layer of the stem portion of the valve.

17. The valve of claim 16, wherein the coefficient of friction exhibited by the surface of the stem portion of the valve caused by the filler material in the surface layer varies with the percentage by volume of the filler material, and wherein there is a sufficient quantity of filler material in the surface layer to produce a desired coefficient of friction.

18. The valve of claim 17, wherein the percentage by volume of the FRCMC material forming the surface layer of the stem portion consisting of the filler material is within a range of about 5.0 to 25.0 percent.

19. The valve of claim 1, wherein an end of the woven fiber rope extends into an upper part of the head portion of the valve, said end of the woven fiber rope extending into the head portion being frayed.

\* \* \* \* \*